(12) United States Patent
Hancu et al.

(10) Patent No.: US 7,987,663 B2
(45) Date of Patent: Aug. 2, 2011

(54) METHODS FOR REDUCING EMISSIONS FROM DIESEL ENGINES

(75) Inventors: Dan Hancu, Clifton Park, NY (US); Benjamin Hale Winkler, Albany, NY (US); Gregg Anthony Deluga, Playa del Ray, CA (US); Daniel George Norton, Niskayuna, NY (US); Frederic Vitse, Knoxville, TN (US)

(73) Assignee: General Electric Company, Niskayuna, NY (US)

( * ) Notice: Subject to any disclaimer, the term of this patent is extended or adjusted under 35 U.S.C. 154(b) by 888 days.

(21) Appl. No.: 11/948,305

(22) Filed: Nov. 30, 2007

(65) Prior Publication Data

US 2009/0139215 A1 Jun. 4, 2009

(51) Int. Cl.
*F01N 3/36* (2006.01)
(52) U.S. Cl. ............................... 60/286; 60/295; 60/301
(58) Field of Classification Search .................... 60/295, 60/299, 301, 303, 286
See application file for complete search history.

(56) References Cited

U.S. PATENT DOCUMENTS

| | | | |
|---|---|---|---|
| 4,266,946 A | 5/1981 | Niebylski |
| 4,479,473 A | 10/1984 | Wade |
| 4,744,217 A | 5/1988 | Goerlich et al. |
| 5,586,433 A | 12/1996 | Boegner et al. |
| 5,985,222 A | 11/1999 | Sudduth et al. |
| 6,711,893 B2 | 3/2004 | Ueda et al. |
| 6,887,300 B2 | 5/2005 | Nemser |
| 6,919,047 B1 | 7/2005 | He et al. |
| 6,968,678 B2 | 11/2005 | Le Leux et al. |
| 7,017,336 B2 | 3/2006 | Stiermann |
| 7,040,084 B2 | 5/2006 | Ament |
| 7,155,331 B1 | 12/2006 | Zhang et al. |
| 7,204,081 B2 | 4/2007 | Yasui et al. |
| 2002/0139111 A1 | 10/2002 | Ueda et al. |

(Continued)

FOREIGN PATENT DOCUMENTS

DE 102005055151 A1 6/2006

(Continued)

OTHER PUBLICATIONS

PCT International Search Report dated Jan. 21, 2009.

*Primary Examiner* — Thomas E Denion
*Assistant Examiner* — Jonathan Matthias
(74) *Attorney, Agent, or Firm* — Richard A. DeCristofaro (57) ABSTRACT

A method is provided for operating a diesel engine with reduced emissions. The method comprises combusting a first biodiesel blend fuel in a diesel engine resulting in the production of diesel exhaust gases containing NOx. The diesel exhaust gases are admixed with a second biodiesel blend fuel, and the second biodiesel blend fuel is hydrolyzed to form reducing agents. The diesel exhaust gases containing NOx are passed through an NOx-reducing catalyst to reduce the NOx through a selective catalytic reduction reaction with the reducing agents. The invention further provides a method for operating a diesel engine with reduced emissions, comprising combusting a first biodiesel blend fuel in a diesel engine resulting in the production of diesel exhaust gases containing NOx. A second biodiesel blend fuel is converted in a fuel processor thereby forming reducing agents, and the diesel exhaust gases are admixed with the reducing agents. The diesel exhaust gases containing NOx are passed through an NOx-reducing catalyst to reduce the NOx through a selective catalytic reduction reaction with the reducing agents.

22 Claims, 10 Drawing Sheets

U.S. PATENT DOCUMENTS

| | | |
|---|---|---|
| 2004/0154215 A1 | 8/2004 | Kass et al. |
| 2004/0159096 A1 | 8/2004 | Yasui et al. |
| 2004/0261403 A1 | 12/2004 | Asmus et al. |
| 2005/0002843 A1* | 1/2005 | Kim et al. .................. 423/239.1 |
| 2005/0137083 A1 | 6/2005 | Rocha et al. |
| 2005/0138916 A1 | 6/2005 | Bonadies et al. |
| 2005/0178110 A1 | 8/2005 | Mital et al. |
| 2005/0267224 A1 | 12/2005 | Herling et al. |
| 2007/0000239 A1 | 1/2007 | Liu et al. |
| 2007/0000243 A1* | 1/2007 | Liu et al. .......................... 60/299 |
| 2007/0130918 A1 | 6/2007 | Cueman et al. |
| 2007/0271908 A1 | 11/2007 | Hemingway et al. |
| 2009/0320789 A1* | 12/2009 | Lund ............................ 123/299 |

FOREIGN PATENT DOCUMENTS

| | | |
|---|---|---|
| EP | 1211394 A2 | 6/2002 |
| EP | 1475140 A1 | 11/2004 |
| EP | 1547669 A1 | 12/2004 |
| EP | 1835141 A2 | 9/2007 |
| FR | 2884859 A1 | 10/2006 |
| WO | WO0134950 A1 | 5/2001 |
| WO | 2006068849 A1 | 6/2006 |
| WO | 2006068850 A1 | 6/2006 |
| WO | WO2006092392 A1 | 9/2006 |
| WO | WO2007147041 A2 | 12/2007 |

* cited by examiner

On-board generation of NOx reductants

METHODS FOR REDUCING EMISSIONS FROM DIESEL ENGINES

FIELD OF THE INVENTION

This invention relates to the use of biodiesel fuels in a diesel engine in combination with a selective catalytic reduction system to reduce NOx, particulates, and $CO_2$ emissions from the combustion process.

BACKGROUND OF THE INVENTION

Current emission control regulations necessitate reduction of pollutant species in diesel engine exhaust. These pollutants include carbon monoxide, unburned hydrocarbons, particulates or particulate matter, and nitrogen oxides (NOx). Additionally, reduction of $CO_2$ emissions is also being increasingly mandated. The decrease in the amounts of the pollutant chemical species produced during the engine operation is achieved by an optimized operation of the internal combustion engine, pre-treatments of the fuel and fuel additives, and post-treatment processing and filtration for conversion of exhaust into harmless gasses. Both oxidation and reduction processes, as well as catalytic oxidation and reduction processes are used for improving exhaust gas chemistry. The particulates are typically reduced by equipping diesel engines with particulate traps mounted in the exhaust stream, which trap or otherwise collect particulates from the exhaust to prevent their emission to the atmosphere. Catalytic oxidizers have been proposed to reduce the emission of particulates, gaseous hydrocarbons, and carbon monoxide from diesel engines. These devices do not trap the particulates, but are primarily intended to oxidize particulates while also oxidizing unburned hydrocarbons and carbon monoxide to reduce emissions of these substances.

NOx, principally NO and $NO_2$, contributes to smog, ground level ozone formation and acid rain. NO is produced in large quantities at the high combustion temperatures associated with diesel engines. The $NO_2$ is formed principally by the post oxidation of NO in the diesel exhaust stream. Approaches to reduce NOx include, for instance, retarding engine timing, exhaust gas recirculation, or injection of a reducing agent; however, there is typically a tradeoff between NOx and particulates. For example, exhaust gas recirculation and engine timing changes can reduce the temperature of combustion to thereby decrease NOx formation, but combustion is also affected. When $NO_2$ is reduced due to lower temperature, particulate emissions tend to increase and conditions favoring low emissions of NOx often favor production of increased levels of CO and HC. Exhaust aftertreatment devices achieve NOx reduction by using a reductant agent, which is added to the exhaust gas entering the aftertreatment device and reacts with NOx over a catalyst in a process of selective catalytic reduction (SCR). In the selective catalytic reduction process NOx is reduced to $N_2$ by reacting with $NH_3$ (or urea as a source of $NH_3$) over a selective catalyst. SCR is efficient for NOx reduction as long as the exhaust temperature is within the active temperature range of the catalyst, which is typically above 300° C.

As noted above, a trade-off exists between particulates and nitrogen oxides, that is, when combustion conditions are modified to favor low nitrogen oxides emissions, particulates are increased. For example, when NOx reduction is attempted by modifying engine timing and/or recirculating exhaust gas, particulates typically are increased. Particulate traps do not directly increase NOx, but have been associated with increased production of carbon monoxide. In addition, even with a trap, unburned hydrocarbons remain a problem. By modifying combustion to achieve more complete oxidation, decreases can be achieved for pollutants resulting from incomplete combustion, but NOx is typically increased under these conditions.

Various combustion methods, fuel treatments and additives, post-combustion exhaust treatments, traps, and exhaust filtration systems have been proposed to reduce one or more of the noted pollutants or to solve a problem related to diesel exhaust. However, the achievement of lower emissions of NOx and overall $CO_2$ emissions reduction, while controlling particulates over reasonable periods of time, continues to present a technical challenge.

SUMMARY OF THE INVENTION

Embodiments of the invention provide methods and devices for improving the emission control in internal combustion engines fueled by diesel fuel, including lean-burn engines. Embodiments of the invention provide for the usage of biodiesel or biodiesel blend fuel for fueling diesel engines and generating exhaust streams with reduced particulates and lifecycle $CO_2$ emissions. Embodiments of the invention further provide for the production of reducing agents from biodiesel or biodiesel blend diesel fuel, and the use of these reducing agents for the catalytic reduction of NOx to $N_2$.

Briefly stated, in accordance with one embodiment of the invention, there is provided a method for operating a diesel engine with reduced emissions, including combusting a first biodiesel blend fuel in a diesel engine resulting in the production of diesel exhaust gases containing NOx; admixing the diesel exhaust gases with a second biodiesel blend fuel; hydrolyzing the second biodiesel blend fuel to form reducing agents; and passing the diesel exhaust gases containing NOx through an NOx-reducing catalyst to reduce the NOx through a selective catalytic reduction reaction with the reducing agents.

In accordance with another embodiment of the invention, there is provided a method for operating a diesel engine with reduced emissions, including combusting a first biodiesel blend fuel in a diesel engine resulting in the production of diesel exhaust gases containing NOx; converting a second biodiesel blend fuel in a fuel processor thereby forming reducing agents; admixing the diesel exhaust gases with the reducing agents; passing the diesel exhaust gases containing NOx through an NOx-reducing catalyst to reduce the NOx through a selective catalytic reduction reaction with the reducing agents.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION

Neat biodiesel and biodiesel blends reduce particulate matter, hydrocarbons, and carbon monoxide (CO) emissions, but increase NOx emissions compared with petrodiesel fuel. In addition, due to the renewable nature of biodiesel, overall emissions of $CO_2$ and impact on greenhouse gas emissions are considerably lower when using biodiesel and biodiesel blends. Biodiesel fuels are mainly methyl or ethyl esters of fatty acids, often containing unsaturated bonds and including palmitic, stearic, oleic, linoleic, and linolenic acids, among others. According to one embodiment of the present invention, ester functionality and its unsaturated character make biodiesel a suitable reductant of NOx contained in exhaust gas streams.

Figure 1:
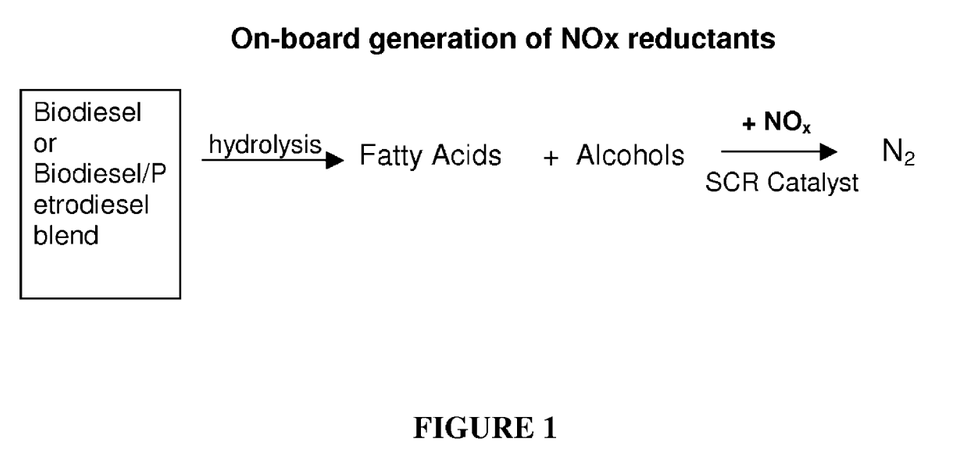
FIG. 1 is a schematic representation of chemical processes carried out during the on-board thermal hydrolysis of biodiesel fuel and the SCR reduction of NOx in the exhaust stream in accordance with an embodiment of the invention.

As shown in FIG. 1, on-board thermal hydrolysis of biodiesel esters results in the production of fatty acids and alcohols. This reaction is exemplified for a generic methyl ester having a formula as follows:

where the R group is a variable hydrocarbon chain.

According to one embodiment of the present invention, the ester hydrolysis reaction is carried out in the diesel engine exhaust stream. Water for hydrolysis is present in the exhaust as the product of the diesel fuel combustion, along with $CO_2$ and other combustion products. The products of the ester hydrolysis reaction act as the reducing agents reacting with NOx present in the exhaust stream on the SCR catalyst, thus catalytically reducing NOx to $N_2$.

The SCR reaction is carried out on the SCR catalysts, which are typically in the form of pellets or beads in a container, or coated on the walls of a monolithic structure, such as a monolithic structure in a honeycomb configuration. Monolithic structures are well known in the art and are typically composed of ceramic or metal material forming open channels from the inlet to the outlet, with channels in some cases having turns and bends. The catalyst material is typically formed into a sol or colloidal dispersion in a liquid carrier and then applied to internal surfaces of the monolithic metal or ceramic substrate to form a layer of catalyst coating on these internal surfaces. The cell size and shape of the monolithic structure are selected to obtain the desired surface area, pressure drop, and heat and mass transfer coefficients required for a particular application. Such parameters are readily ascertainable to one of skill in the art. In accordance with the present invention, the channels can be of any shape suitable for ease of production and coating, and appropriate flow of the gas stream. For example, for metal substrates, channels may be corrugated into straight, sinusoidal, or triangular shapes, and/or may include a herringbone or zig-zag pattern. For a ceramic substrate, the channels may be, for example, square, triangular, or hexagonal, or any shape that can be formed by extrusion or other methods of manufacture known in the art. Channel diameters are typically in the range of about 0.01 inches to about 0.2 inches, and are preferably from about 0.04 inches to about 0.1 inches.

The SCR catalyst herein refers to any catalyst known in the art that is useful for the catalytic reduction of NOx via reaction with a mixture of alcohols, fatty acids, and hydrocarbons. Typical active catalytic components of the NOx SCR catalyst include Pt, Pd, Rh, and Ir. High surface area refractory oxide supports or zeolites may be included. Typical refractory oxide supports are alumina, alumina with additives such as Si, Ca, Ba, Ti, La or other components to provide increased thermal stability. In addition, modifying components such as, for example, Na, Co, Mo, K, Cs, Ba, Ce, and La may be used to improve the selectivity of the reaction, by reducing the oxidation activity of the catalyst. Additional NOx selective reduction catalyst compositions may contain Cu, Co, Ni, Fe, Ga, La, Ce, Zn, Ti, Ca, Ba, Ag or mixtures thereof, or Pt, Ir, Rh or mixtures thereof.

The monolithic metal substrate can be formed of parallel plates, multiple tubular elements, corrugated metal foil, a honeycomb, or multi-cellular monolith and is made of a corrosion resistant metallic alloy suitable for high temperature service in aggressive environments characteristic of automotive exhaust. Such alloys include, but are not limited to, oxidation-resistant high temperature ferritic Cr—Al alloys. These iron-chromium-aluminum alloys typically contain up to seven percent of Al and some other additives. When exposed to high temperature oxidizing environments the alloy forms a corrosion-resistant layer of aluminum and chromium oxides, which prevents further oxidation.

Figure 2:
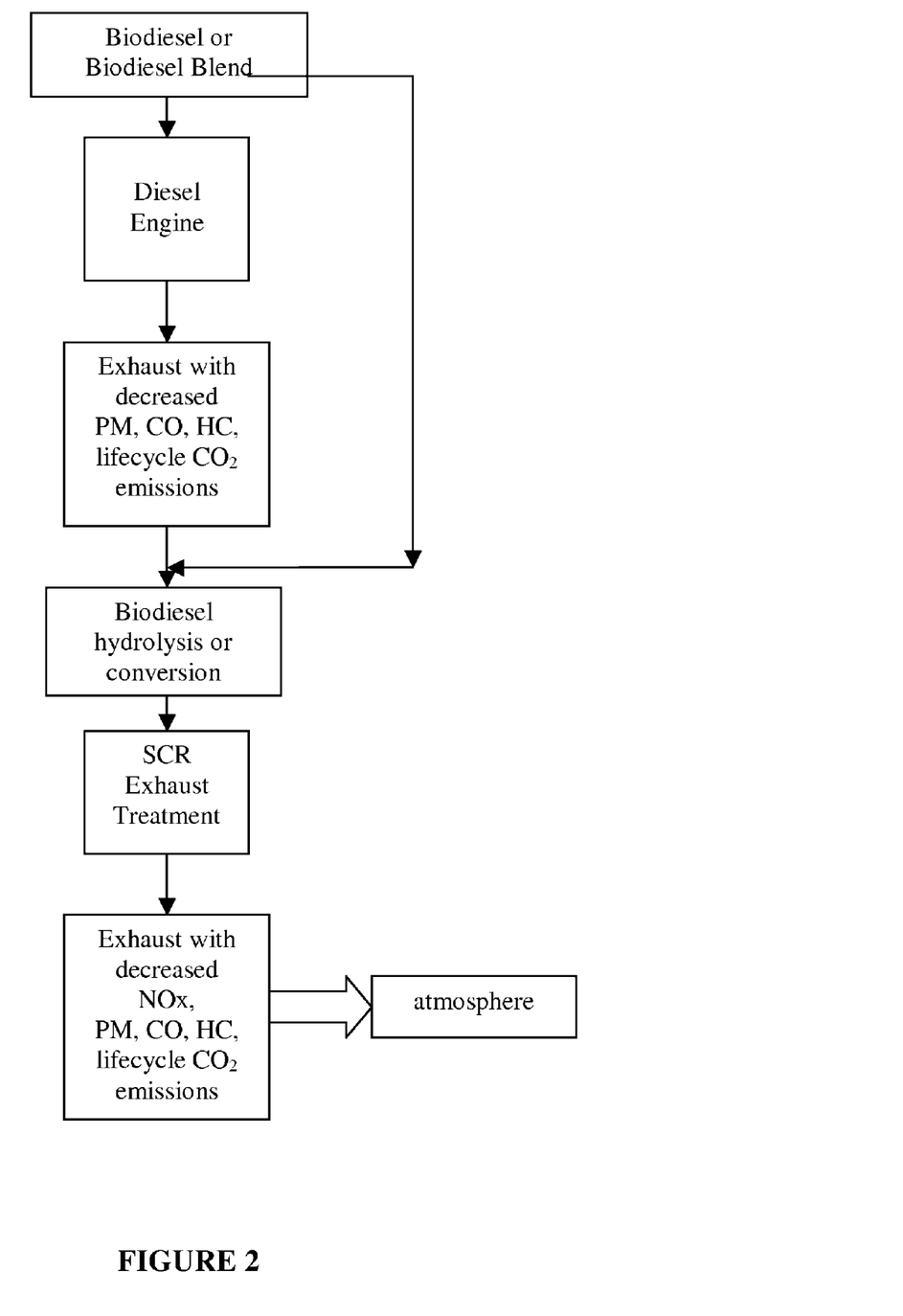
FIG. 2 is a schematic block-diagram of a method for operating a diesel engine with reduced emissions in accordance with an embodiment of the invention.

Referring now to FIG. 2, a schematic block-diagram of operation of an embodiment of the invention is shown. A biodiesel or biodiesel blend is used to fuel a diesel engine, resulting in decreased emissions of particulate matter (PM) and also decreased lifecycle $CO_2$ emissions due to the renewable nature of biodiesel. Decreases in CO and hydrocarbon (HC) emissions are also possible. The biodiesel or biodiesel blend is also injected into the NOx-containing exhaust of the diesel engine and undergoes hydrolysis to produce the reducing agents as products. The SCR exhaust treatment process is then carried out. In this process, the reducing agents convert NOx into $N_2$. Overall, operation of the embodiments of the invention produce exhaust streams with decreased NOx, particulate matter, and lifecycle $CO_2$ emissions into the atmosphere. Decreases in CO and hydrocarbon emissions are also possible.

Another embodiment of the present invention includes a fuel processor that converts a slip stream of biodiesel such as B100 (available from InterWest LC) or biodiesel blend such as B20 into NOx reductants (e.g. hydrocarbons and oxygenates) that are subsequently introduced in the exhaust upstream of the SCR catalyst for NOx reduction.

Figure 3:
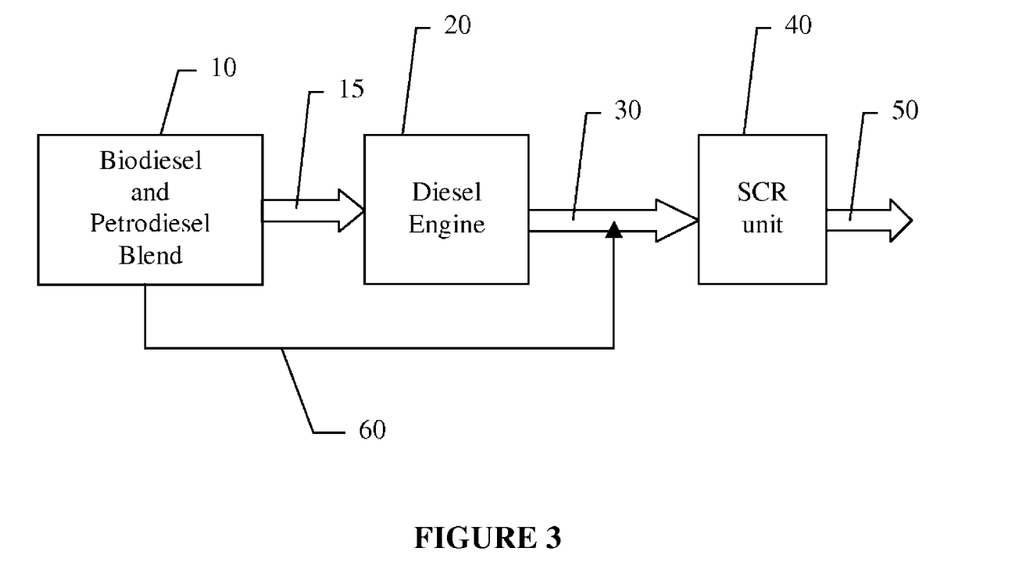
FIG. 3 is a schematic diagram of an embodiment of the invention.

Referring now to FIG. 3, a schematic diagram of an embodiment of the present invention is shown. A fuel tank 10 containing a blend of biodiesel and petrodiesel is used to supply diesel fuel to a diesel engine 20 via a fuel supply line 15. The biodiesel and petrodiesel blend can comprise from about 1 weight percent to about 100 weight percent biodiesel. Preferably, the biodiesel and petrodiesel blend comprises from about 10 weight percent to about 40 weight percent biodiesel. The biodiesel and petrodiesel blend from fuel tank 10 is also injected into an exhaust stream 30 from diesel engine 20 via exhaust treatment line 60. The biodiesel injected into exhaust stream 30 then undergoes hydrolysis, reacting with water contained in exhaust stream 30 thereby forming the reducing agents. The resulting mixture of the reducing agents and diesel engine exhaust is then fed into an SCR unit 40 where selective catalytic reduction of NOx is carried out via reaction of NOx with the reducing agents. The treated exhaust stream 50 containing decreased NOx, particulate matter, and lifecycle $CO_2$ emissions is exhausted into the atmosphere.

Another embodiment of the present invention includes a fuel processor (not shown) that converts a slip stream of the biodiesel and petrodiesel blend from fuel tank 10 into NOx reductants (hydrocarbons, oxygenates) that are subsequently injected into exhaust stream 30. In this embodiment, conversion of the biodiesel and petrodiesel blend is performed in the fuel processor instead of or in addition to hydrolysis in the exhaust stream 30. Conversion of the biodiesel and petrodiesel blend may be performed in the fuel processor via a reaction using a diesel conversion catalyst. Suitable examples of a diesel conversion catalyst for use in the invention include Rh, Pt, Pd, Sn, Ir, La, Ce, Co, or a combination thereof, deposited on alumina, zeolite, or YSZ supports.

Figure 4:
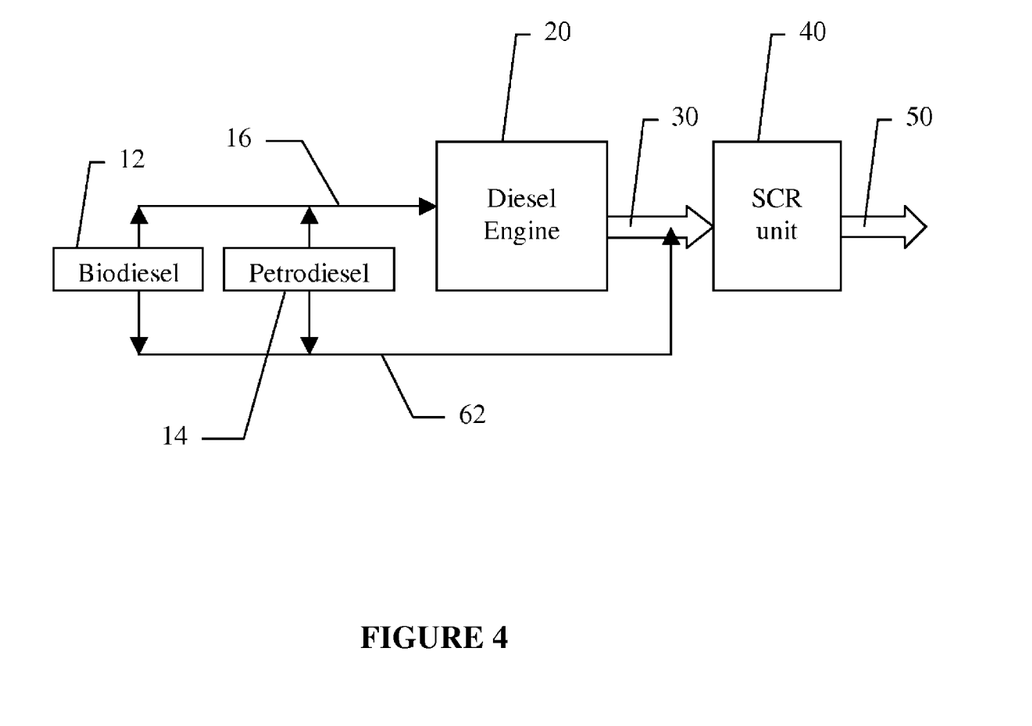
FIG. 4 is a schematic diagram of an alternative embodiment of the invention.

As illustrated in FIG. 4, a biodiesel fuel tank 12 and a petrodiesel fuel tank 14 supply blended fuel to diesel engine 20 via a fuel supply and mixing line 16. According to this embodiment of the invention, biodiesel and petrodiesel are mixed in proportions which are defined by the type of diesel engine 20, operating conditions, optimized emissions control, and other parameters. The blend of biodiesel and petrodiesel supplied through the fuel supply and mixing line 16 comprises about 1 weight percent to about 100 weight percent biodiesel. Preferably, the biodiesel and petrodiesel blend supplied through the fuel supply and mixing line 16 comprises from about 10 weight percent to about 40 weight percent biodiesel. Biodiesel fuel tank 12 and petrodiesel fuel tank 14 also supply fuel for injection into exhaust stream 30 via exhaust treatment and mixing line 62. The biodiesel and petrodiesel blend supplied through the exhaust treatment and mixing line 62 comprises about 1 weight percent to about 100 weight percent biodiesel. Preferably, the biodiesel and petrodiesel blend supplied through the exhaust treatment and mixing line 62 comprises from about 75 weight percent to about 100 weight percent biodiesel. The biodiesel injected into exhaust stream 30 then undergoes hydrolysis, reacting with water contained in exhaust stream 30, thereby forming reducing agents. The resulting mixture of the reducing agents and diesel engine exhaust is then fed into SCR unit 40 where the selective catalytic reduction of NOx is carried out via the reaction of NOx with the reducing agents. The resulting treated exhaust stream 50 containing decreased NOx, particulate matter, and lifecycle $CO_2$ emissions is exhausted into the atmosphere.

Figure 5:
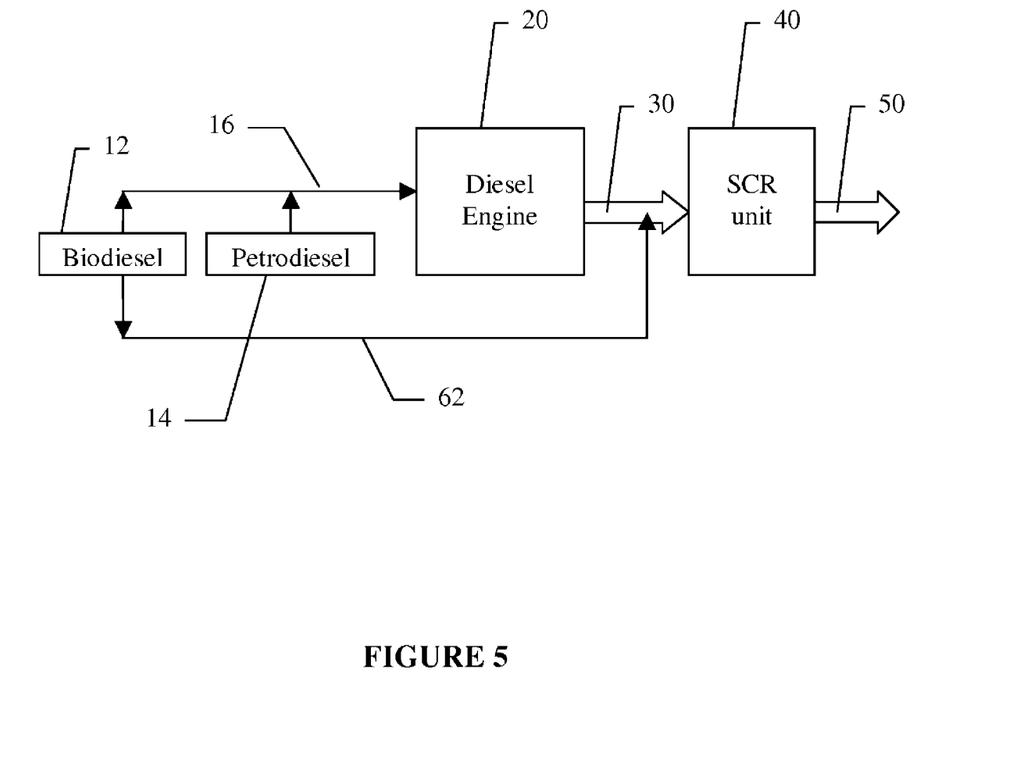
FIG. 5 is a schematic diagram of an alternative embodiment of the invention.

Referring to FIG. 5, a schematic diagram of an embodiment of the invention similar to the embodiment shown in FIG. 4 is presented. In this embodiment, only biodiesel, and no petrodiesel, is supplied for injection into exhaust stream 30 via exhaust treatment and mixing line 62. Thus, the composition of fuel supplied through exhaust treatment and mixing line 62 is 100% biodiesel.

Figure 6:
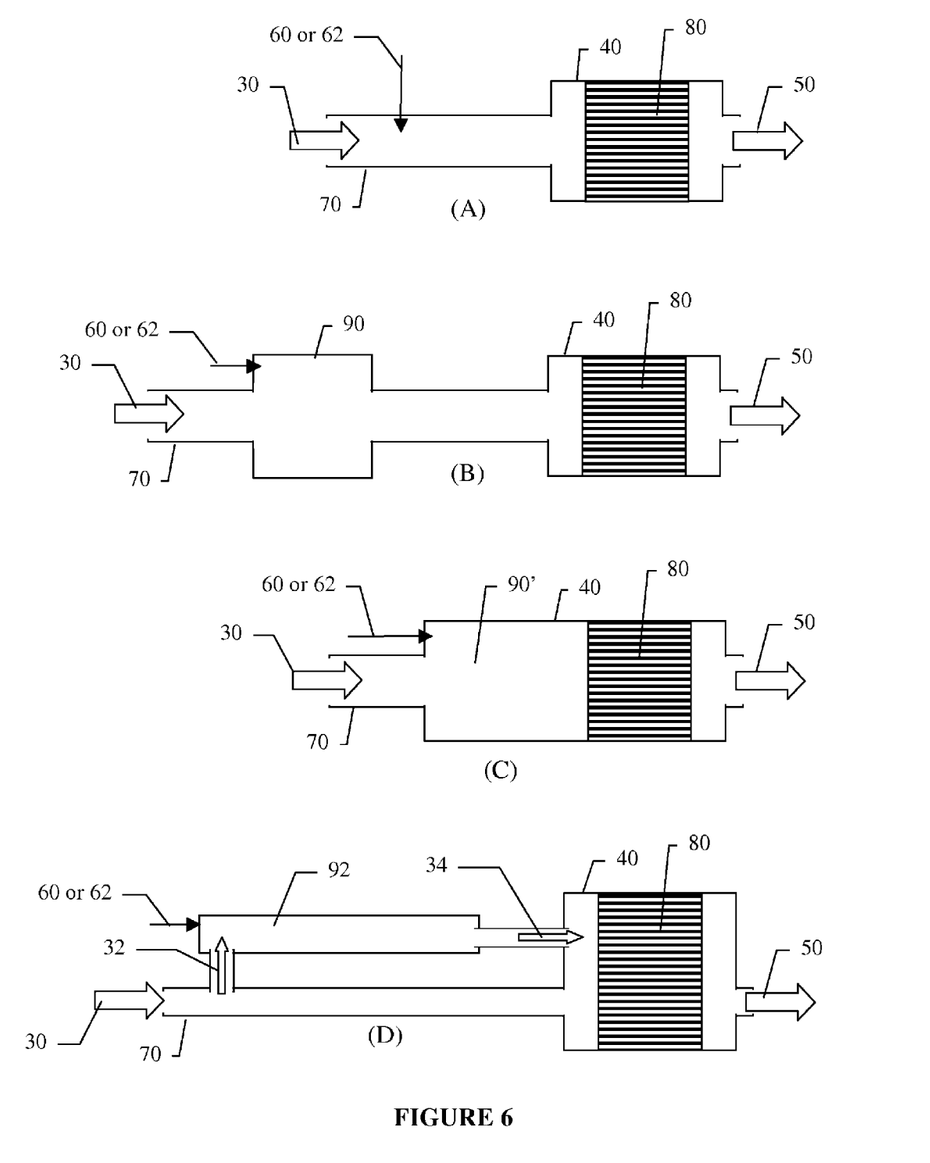
FIGS. 6(a)-6(d) illustrate alternative embodiments of an exhaust treatment system for the reduction of NOx in accordance with an embodiment of the invention.

In FIG. 6, several embodiments of an exhaust treatment system for the reduction of NOx via a SCR process are shown. Exhaust stream 30 enters an exhaust line 70 which is connected to SCR unit 40. SCR unit 40 contains an SCR catalyst preferably coated on a multi-channel, high surface area monolithic structure 80, such as a honeycomb-like structure with low resistance to exhaust gas flow. After SCR reduction of NOx, the resulting treated exhaust stream 50 containing decreased NOx, particulate matter, and lifecycle $CO_2$ emissions is exhausted into the atmosphere.

As illustrated in FIG. 6A, a biodiesel fuel, or biodiesel and petrodiesel blend fuel is injected via exhaust treatment and mixing line 62 or exhaust treatment line 60 into exhaust line 70. The biodiesel is then hydrolyzed via reaction with water contained in exhaust stream 30. The resulting mixture of the reducing agents and diesel engine exhaust is then fed into an SCR unit 40 where the selective catalytic reduction of NOx is carried out via reaction of NOx with reducing agents.

Referring to FIG. 6B, a biodiesel fuel, or biodiesel and petrodiesel blend fuel is injected via exhaust treatment and mixing line 62 or exhaust treatment line 60 into a hydrolysis and mixing zone 90 established along exhaust line 70. The biodiesel is then hydrolyzed in hydrolysis and mixing zone 90 via reaction with water contained in exhaust stream 30. The resulting mixture of the reducing agents and diesel engine exhaust is then fed into SCR unit 40 where the selective catalytic reduction of NOx is carried out via reaction of NOx with the reducing agents.

As shown in FIG. 6C, the biodiesel, or biodiesel and petrodiesel blend fuel is injected via exhaust treatment and mixing line 62 or exhaust treatment line 60 into a hydrolysis and mixing zone 90' established within SCR unit 40. The biodiesel is then hydrolyzed in hydrolysis and mixing zone 90' via reaction with water contained in exhaust stream 30. The resulting mixture of the reducing agents and diesel engine exhaust is then processed on an SCR unit 40 catalyst where the selective catalytic reduction of NOx is carried out via reaction of NOx with the reducing agents.

Referring to FIG. 6D, a portion of exhaust stream 30 is redirected into a hydrolysis zone 92 as shown by arrow 32. Exhaust stream 30 is fed directly into SCR unit 40 via exhaust line 70. The biodiesel fuel, or biodiesel and petrodiesel blend fuel is injected via exhaust treatment and mixing line 62 or exhaust treatment line 60 into a hydrolysis zone 92. The biodiesel is then hydrolyzed in hydrolysis zone 92. The resulting mixture of the reducing agents and diesel engine exhaust is then fed into SCR unit 40 as shown by arrow 34 where the selective catalytic reduction of NOx is carried out via reaction of NOx with the reducing agents.

EXAMPLE 1

Use of Biodiesel Blends B100/B20 as SCR Reductants

Catalyst Preparation

DISPAL® boehmite gel (available from Sasol North America, Inc.) was slurried in de-ionized water in the presence of ammonium hydroxide until the pH of the slurry was 9. Separately, $Ga(NO_3)_3 \cdot 6 H_2O$ (Alpha Aesar, 99.999% purity), and $AgNO_3$ (Alpha Aesar, 99.995% purity) were dissolved in water, and added to the alumina slurry. Finally, the content was mixed for fifteen minutes, dried in an IR oven to remove any liquid, sieved through a 60 mesh sieve followed by calcination at 650° C. in air for six hours. The temperature profile for the calcination was as follows: (a) 1.1° C./min ramp from 25° C. to 110° C., (b) soak at 110° C. for 1.5 hours, (c) 5° C./min ramp from 110° C. to 650° C., and (d) soak at 650° C. for 6 hours. The calcined powder was then re-slurried in water (at 40 wt. %) and then dip-coated on cordierite cores (230 CPSI, 2" in diameter). The final composition of the catalyst was 15 wt. % Ga, 2 wt. % Ag at 110 g $Al_2O_3$/L monolith.

SCR Performance

Figure 7:
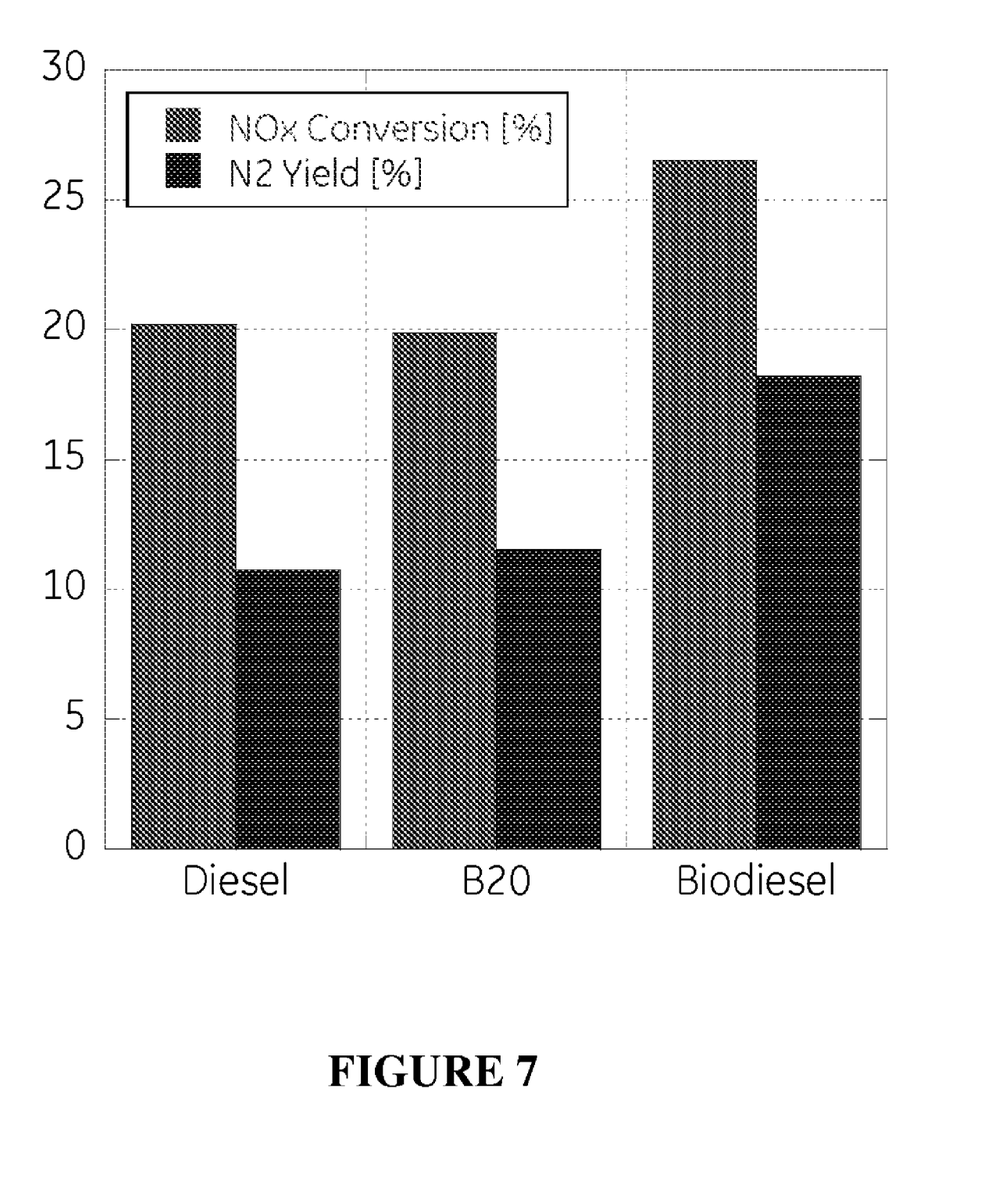
FIG. 7 is a graph of experimental results for the performance of a GaAg monolith with ULSD (Ultra Low Sulfur Diesel) and biodiesel.

The performance of the SCR monolith at a space velocity (SV) of 40,000 $hr^{-1}$ was tested with the exhaust of a 5.9 L diesel engine (manufactured by Cummins, Inc.) using ULSD (15 ppm Sulfur, available from Sprague Energy Corporation) and biodiesel as reductants at a molar ratio of $C_1$:NO=6, and a temperature of 375° C. The catalyst performance with diesel, B20, and biodiesel is shown in FIG. 7.

EXAMPLE 2

Converting B20 to Produce NOx Reductants

Diesel Conversion Catalyst Preparation

A disk of alumina foam (65 ppi, 20 mm diameter, 99.5% $Al_2O_3$) was dipped in a slurry of alumina powder that contained the metal salt precursors (Pt, Ir, Rh) in water. The foam was dried in a vacuum oven until all water was removed, and then calcined in air at 600° C.

Diesel Conversion Performance

Figure 8:
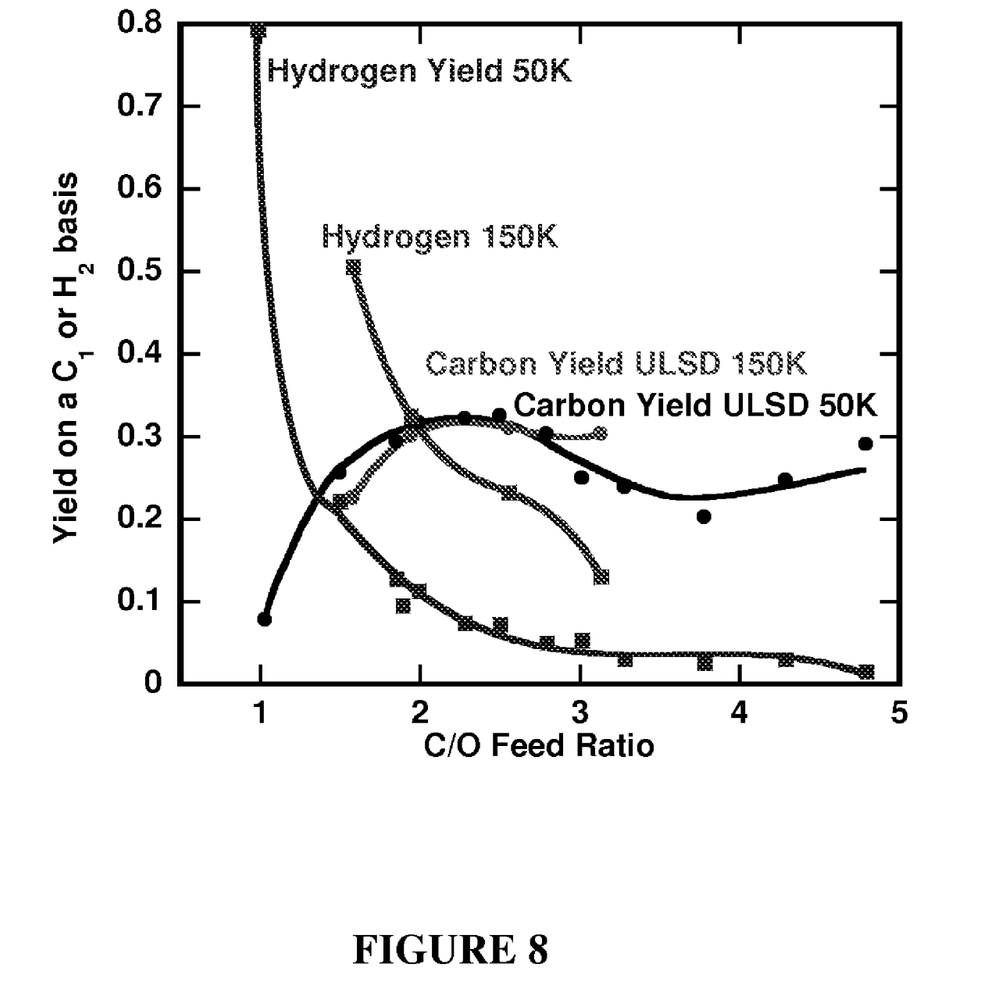
FIG. 8 is a graph illustrating the yields of different reductant fractions obtained from ULSD as a function of fuel: air ratio.
Figure 9:
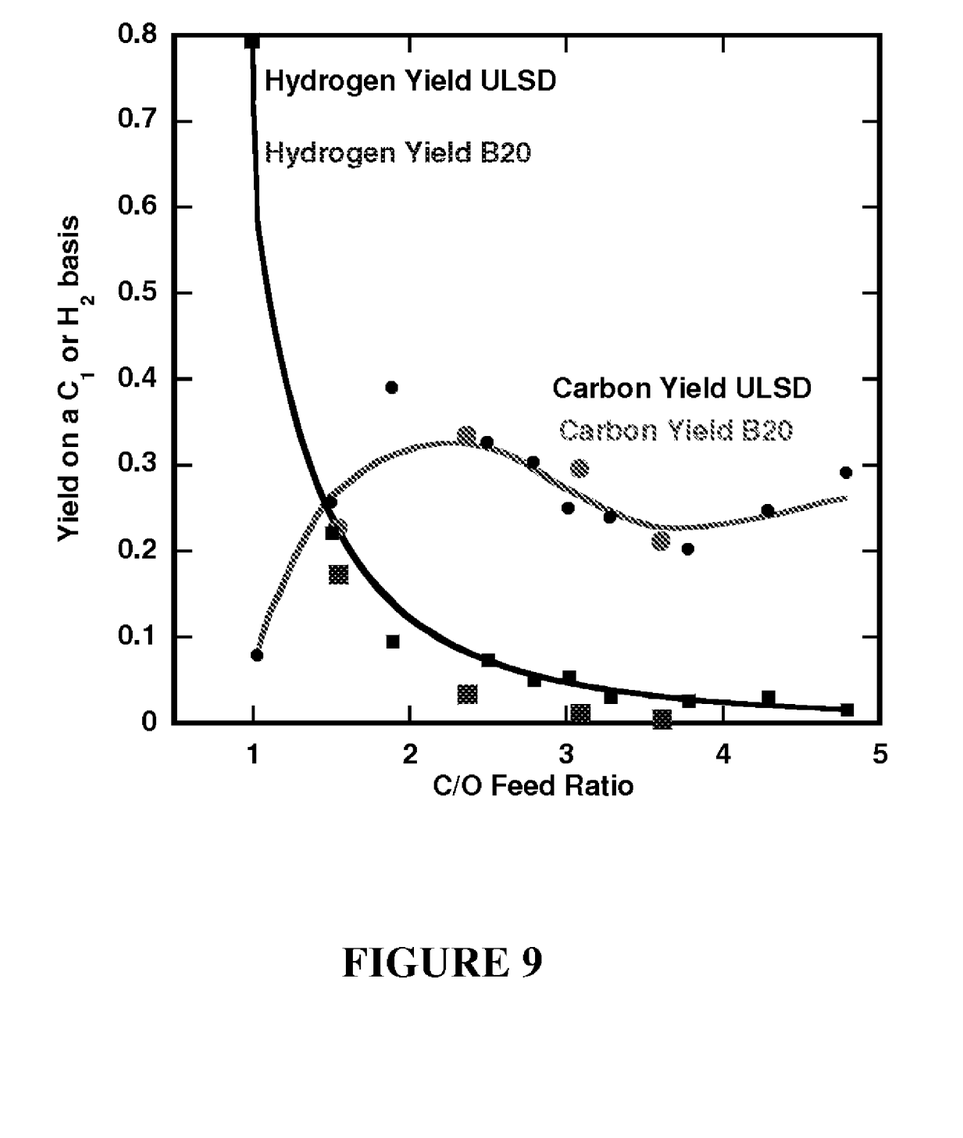
FIG. 9 is a graph illustrating the yields of different reductant fractions obtained from a biodiesel blend (B20) as a function of fuel:air ratio.

A mixture of diesel fuel (ULSD or B20) and air (fuel:air ratio=1 to 3) was finely dispersed via an atomizing nozzle and converted over a Pt—Ir—Rh catalyst into a mixture of smaller hydrocarbons at a temperature of 650° C., and space velocity of 100,000 hr−1. The reaction mixture was then separated into gaseous and liquid fractions by a series of condensers, and then analyzed by gas chromatography. Yields of different reductant fractions obtained from ULSD are presented in FIG. 8 as $C_3$-$C_{12}$ yield ($C_1$ basis) as a function of fuel:air ratio resulting from ULSD at a space velocity of 50,000 hr−1 and 150,000 hr−1. Yields of different reductant fractions obtained from B20 are presented in FIG. 9 as $C_3$-$C_{12}$ yield ($C_1$ basis) as a function of fuel:air ratio resulting from B20 at a space velocity of 50,000 $hr^{-1}$.

EXAMPLE 3

Performance of GaAg Monolith with Converted Biodiesel (B100) as Reductant

Figure 10:
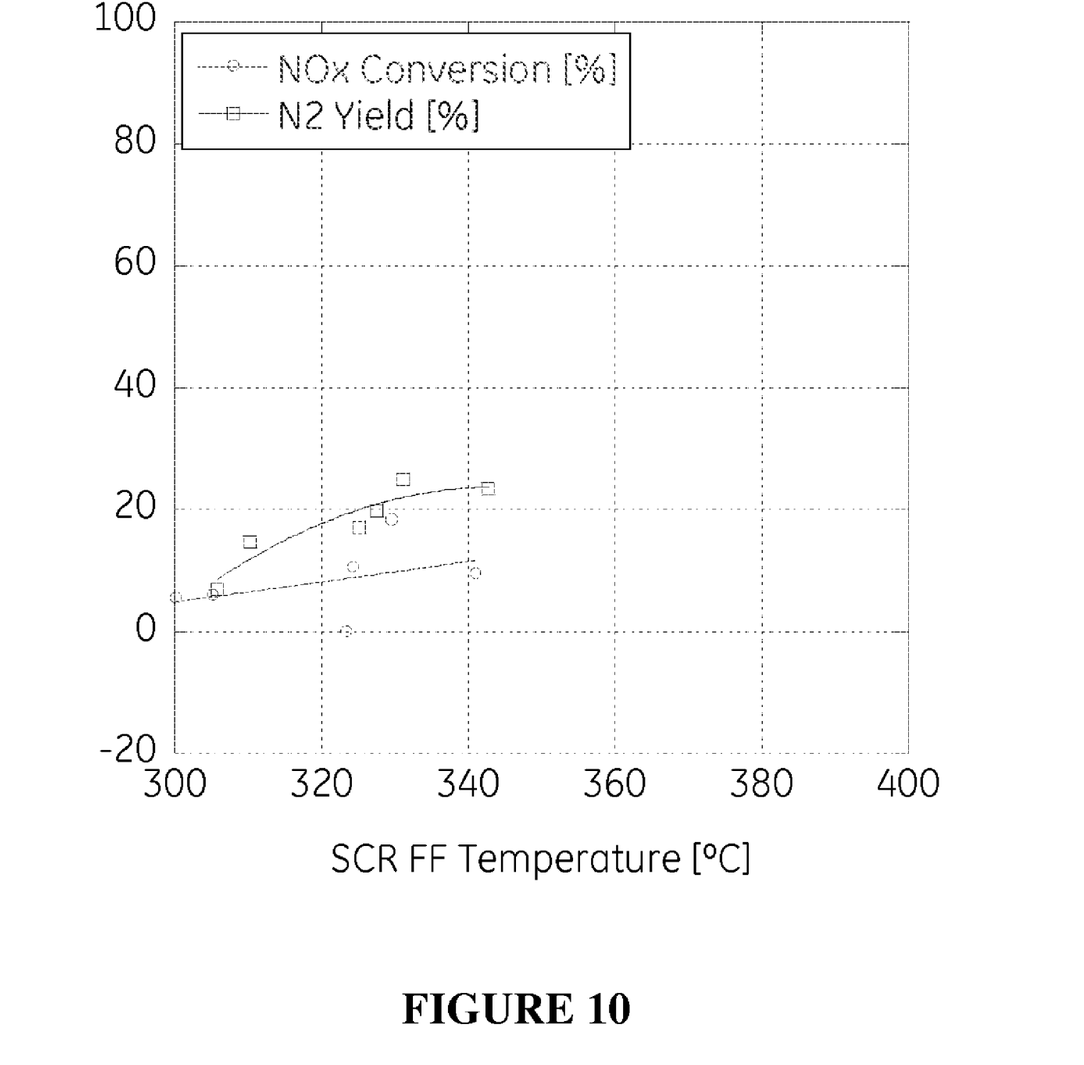
FIG. 10 is a graph illustrating the performance of a GaAg monolith with a converted biodiesel (B100) as a reductant as a function of temperature.

Performance of a GaAg monolith with converted biodiesel (B100) as a reductant as a function of temperature is illustrated in FIG. 10. SCR conditions of the experiment included a space velocity of 40,000 $hr^{-1}$, treatment of the exhaust from a 5.9 L diesel engine using ULSD; Diesel Conversion Catalyst (RhIrPt): space velocity of 150,000 $hr^{-1}$, temperature of 600° C., and fuel:air ratio=3.

All cited patents, patent applications, and other references are incorporated herein by reference in their entirety.

All ranges disclosed herein are inclusive of the endpoints, and the endpoints are combinable with each other.

It is to be noted that the terms "first," "second," and the like as used herein do not denote any order, quantity, or importance, but rather are used to distinguish one element from another. The modifiers "about" and "approximately" used in connection with a quantity is inclusive of the stated value and has the meaning dictated by the context (e.g., includes the degree of error associated with measurement of the particular quantity). The use of the terms "a" and "an" and "the" and similar referents in the context of describing the invention (especially in the context of the following claims) are to be construed to cover both the singular and the plural, unless otherwise indicated herein or clearly contradicted by context.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A method for operating a diesel engine with reduced emissions, comprising:
    combusting a first biodiesel blend fuel in a diesel engine resulting in the production of diesel exhaust gases containing NOx;
    admixing the diesel exhaust gases with a second biodiesel blend fuel in an exhaust line;
    hydrolyzing the second biodiesel blend fuel within a hydrolysis and mixing zone established within the exhaust line to form reducing agents; and
    passing the diesel exhaust gases containing NOx through an NOx-reducing catalyst to reduce the NOx through a selective catalytic reduction reaction with the reducing agents.

2. The method of claim 1, wherein the first biodiesel blend fuel and the second biodiesel blend fuel each comprise from about 1 weight percent to about 100 weight percent biodiesel.

3. The method of claim 2, wherein the first biodiesel blend fuel comprises from about 10 weight percent to about 40 weight percent biodiesel.

4. The method of claim 2, wherein the second biodiesel blend fuel comprises from about 75 weight percent to about 100 weight percent biodiesel.

5. The method of claim 1, wherein the method results in reduced emissions of NOx.

6. The method of claim 1, wherein the method results in reduced emissions of particulates.

7. The method of claim 1, wherein the method results in reduced emissions of lifecycle $CO_2$.

8. The method of claim 1, wherein the method results in reduced emissions of hydrocarbons.

9. The method of claim 1, wherein the method results in reduced emissions of CO.

10. The method of claim 1, further comprising:
    providing a biodiesel contained in a biodiesel storage tank;
    providing a petrodiesel contained in a petrodiesel storage tank;
    mixing the biodiesel from the biodiesel storage tank and the petrodiesel from the petrodiesel storage tank to form the first biodiesel blend and the second biodiesel blend.

11. The method of claim 1, wherein the first biodiesel blend and the second biodiesel blend are identical.

12. The method of claim 1, wherein the method provides for simultaneous reduction of emissions of at least three pollutants selected from the group consisting of NOx, particulates, $CO_2$, hydrocarbons, and CO.

13. The method of claim 1, wherein the NOx-reducing catalyst comprises Pt, Pd, Rh, Ir, Ag, Na, Co, Mo, K, Cs, Ba, Ce, La, Cu, Ni, Fe, Ga, Zn, Ti, Ca, or a combination thereof.

14. A method for operating a diesel engine with reduced emissions, comprising:
   combusting a first biodiesel blend fuel in a diesel engine resulting in the production of diesel exhaust gases containing NOx;
   admixing the diesel exhaust gases with a second biodiesel blend fuel in an exhaust line;
   converting a second biodiesel blend fuel within a hydrolysis and mixing zone established within the exhaust line thereby forming reducing agents;
   admixing the diesel exhaust gases containing NOx with the reducing agents; and
   passing the mixture of diesel exhaust gases containing NOx and reducing agents from the exhaust line into an NOx-reducing catalyst containing unit to reduce the NOx through a selective catalytic reduction reaction.

15. The method of claim 14, wherein the first biodiesel blend fuel and the second biodiesel blend fuel each contain from about 1 percent to 100 percent biodiesel.

16. The method of claim 15, wherein the first biodiesel blend fuel comprises from about 10 weight percent to about 40 weight percent biodiesel.

17. The method of claim 15, wherein the second biodiesel blend fuel comprises from about 75 weight percent to about 100 weight percent biodiesel.

18. The method of claim 14, further comprising:
   providing a biodiesel contained in a biodiesel storage tank;
   providing a petrodiesel contained in a petrodiesel storage tank;
   mixing the biodiesel from the biodiesel storage tank and the petrodiesel from the petrodiesel storage tank to form the first biodiesel blend and the second biodiesel blend.

19. The method of claim 14, wherein the first biodiesel blend and the second biodiesel blend are identical.

20. The method of claim 14, wherein the method provides for simultaneous reduction of emissions of at least three pollutants selected from the group consisting of NOx, particulates, $CO_2$, hydrocarbons, and CO.

21. The method of claim 14, wherein the NOx-reducing catalyst comprises Pt, Pd, Rh, Ir, Ag, Na, Co, Mo, K, Cs, Ba, Ce, La, Cu, Ni, Fe, Ga, Zn, Ti, Ca, or a combination thereof.

22. The method of claim 14, wherein the second biodiesel blend fuel is converted via a reaction using a diesel conversion catalyst, and the diesel conversion catalyst comprises Rh, Pt, Pd, Sn, Ir, La, Ce, Co, or a combination thereof.

* * * * *